US010393209B2

(12) United States Patent
Schmitt et al.

(10) Patent No.: US 10,393,209 B2
(45) Date of Patent: Aug. 27, 2019

(54) DAMPING VALVE MECHANISM

(71) Applicant: ZF Friedrichshafen AG, Friedrichshafen (DE)

(72) Inventors: Stefan Schmitt, Gochsheim (DE); Thomas Manger, Wasserlosen (DE); Alexander Schwarz, Thuengen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/575,629

(22) PCT Filed: Apr. 18, 2016

(86) PCT No.: PCT/EP2016/058535
§ 371 (c)(1),
(2) Date: Nov. 20, 2017

(87) PCT Pub. No.: WO2016/184627
PCT Pub. Date: Nov. 24, 2016

(65) Prior Publication Data

US 2018/0156298 A1 Jun. 7, 2018

(30) Foreign Application Priority Data

May 21, 2015 (DE) ........................ 10 2015 209 318

(51) Int. Cl.
*F16F 9/46* (2006.01)

(52) U.S. Cl.
CPC ....... *F16F 9/464* (2013.01); *F16F 2230/0011* (2013.01)

(58) Field of Classification Search
CPC .. F16F 9/461; F16F 9/464; F16F 9/466; F16F 9/469; F16F 2230/0011
See application file for complete search history.

(56) References Cited

U.S. PATENT DOCUMENTS

| | | | | |
|---|---|---|---|---|
| 4,905,798 | A | 3/1990 | Engelsdorf | |
| 4,974,707 | A | 12/1990 | Neumann | |
| 5,137,125 | A | 8/1992 | Taubitz | |
| 5,285,878 | A * | 2/1994 | Scheffel | F16F 9/46 188/282.2 |
| 5,400,877 | A * | 3/1995 | Kircher | F16F 9/3278 188/282.3 |
| 5,518,090 | A | 5/1996 | Miller | |
| 5,611,413 | A | 3/1997 | Feigel | |

(Continued)

FOREIGN PATENT DOCUMENTS

| | | |
|---|---|---|
| DE | 3832625 | 4/1989 |
| DE | 3942545 | 6/1991 |

(Continued)

*Primary Examiner* — Thomas J Williams
(74) *Attorney, Agent, or Firm* — Cozen O'Connor

(57) ABSTRACT

A damping valve device includes an actuator which carries out an axial displacing movement on a sliding sleeve. The sliding sleeve, along with a fixed valve carrier, forms a slide valve which has two flow directions. The slide sleeve is impinged with damping medium on a front side and on a rear side in an incident flow direction, and the front side of the slide sleeve and rear side of the slide sleeve are impinged hydraulically in parallel by damping medium during the incident flow.

9 Claims, 2 Drawing Sheets

(56) References Cited

U.S. PATENT DOCUMENTS

| | | | | |
|---|---|---|---|---|
| 2002/0121415 | A1* | 9/2002 | Hartel | F16F 9/464<br>188/282.2 |
| 2014/0116825 | A1 | 5/2014 | Lindeman | |
| 2014/0202561 | A1* | 7/2014 | Bergfeld | G05D 7/0635<br>137/487.5 |
| 2016/0109034 | A1 | 4/2016 | Flühs | |

FOREIGN PATENT DOCUMENTS

| | | |
|---|---|---|
| DE | 4129581 | 3/1993 |
| DE | 3800865 | 10/1998 |
| DE | 102013211014 | 12/2014 |
| EP | 0288736 | 11/1988 |
| GB | 2287770 | 9/1995 |

* cited by examiner

DAMPING VALVE MECHANISM

PRIORITY CLAIM

This is a U.S. national stage of application No. PCT/EP2016/058535, filed on Apr. 18, 2016. Priority is claimed on the following application: Country: Germany, Application No.: 10 2015 209 318.2, filed: May 21, 2015, the content of which is incorporated herein by reference in its entirety.

FIELD OF THE INVENTION

The present invention is directed to a damping valve device having an actuator which carries out an axial displacing movement on a sliding sleeve which forms part of an adjustable valve.

BACKGROUND OF THE INVENTION

An adjustable vibration damper which is marketed for, inter alia, motorcycles is known from US 2014/0116825 A1. In a motorcycle, the permissible overall length of the vibration damper is even more difficult to achieve compared with a passenger vehicle. It has turned out that an adjustable damping valve device having a conventional piston valve and, in addition, a parallel bypass opening as is shown in FIG. 13 of US 2014/0116825 A1is suitable for this specific application.

A coil which exerts an axial displacing force on an armature is arranged in an actuator housing on the piston rod side. A sliding sleeve which, with a valve sleeve fixed in the actuator housing, forms a slide valve is fastened to the armature. A return spring which preloads the sliding sleeve in a defined initial position is also arranged in the actuator housing.

Flow can occur in two directions in the slide valve. It is easy to recognize that dynamic pressure forces caused by an incident flow via the channel in the piston rod tenon exert an opening force on the slide valve. While there is indeed a static pressure compensation because the surface area impinged by pressure on the front side of the sliding sleeve is equal to that on the rear side of the sliding sleeve, the dynamic pressure force component in direction of the channel is appreciably greater than on the rear side of the sliding sleeve.

During an incident flow via the channels in the annular flange of the piston rod tenon, only mutually compensating radial forces act on the sliding sleeve. Consequently, there are substantial dynamic pressure force differences between the two incident flow directions. These differences in pressure force make it more difficult to configure, e.g., the return springs for the sliding sleeve in order to achieve a required damping force characteristic.

It is thus an object of the present invention to provide a damping valve device in which dynamic pressure forces influencing the opening behavior and closing behavior of the slide valve are minimized.

SUMMARY OF THE INVENTION

This object is met in that the front side of the slide sleeve and rear side of the slide sleeve are impinged hydraulically in parallel by damping medium during an incident flow.

In contrast to the cited prior art in which the front side of the slide sleeve and rear side of the slide sleeve are impinged hydraulically in series by damping medium, dynamic pressure forces are extensively compensated at the slide sleeve. Accordingly, the sliding sleeve exhibits a uniform operating behavior which can be easily controlled regardless of the incident flow direction.

In a further advantageous embodiment, it is provided that a return spring which orientates the sliding sleeve in an initial position engages outside of the front side and rear side. The advantage consists in that a return spring, often constructed as helical compression spring, which produces a flow resistance and consequently also influences the dynamic pressure ratios in the damping valve device is now no longer in the flow path and consequently can also not exert any influence.

According to an advantageous embodiment, the return spring is arranged inside the sliding sleeve and exerts the restoring force on a base of the sliding sleeve. The sliding sleeve can have a simple cross section because no additional supporting surfaces are needed for the return spring.

In this respect, it is provided that the return spring is preloaded between the base of the sliding sleeve and the valve carrier. The valve carrier is a comparatively stable component part which can easily support the occurring forces.

In order to maintain the pressure equilibrium of the damping valve overall, the sliding sleeve has at least one connection opening to a pressure compensation space.

The return spring is preferably arranged in the pressure compensation space and is accordingly optimally radially guided. Therefore, a lateral buckling of the spring need no longer be a concern.

A further advantage consists in that the damping valve carrier has a sealing sleeve portion on both sides of a valve cross section of the slide valve. Accordingly, additional separate seals which minimize leaks in the slide valve and which therefore keep the damping behavior reproducible are no longer required.

Optionally, it can be provided that the valve carrier is axially displaceably supported. The preloading of the return spring can be influenced via the displacing mechanism. As a result, the damping force characteristic of the damping valve device can also be controlled.

In order that dynamic pressure forces can be redirected from an axial flow path into a radial flow path, and vice versa, the valve carrier has a central channel to which at least one diagonally extending transfer channel is connected. Turbulence in the slide valve is minimized in this way.

To facilitate an orientation-free mounting and installation position in circumferential direction, the valve carrier has a circumferential collection groove to which the at least one transfer channel is connected.

BRIEF DESCRIPTION OF THE DRAWINGS

The invention will be described more fully referring to the following figures, in which.

DETAILED DESCRIPTION OF THE PRESENTLY PREFERRED EMBODIMENTS

Figure 1:
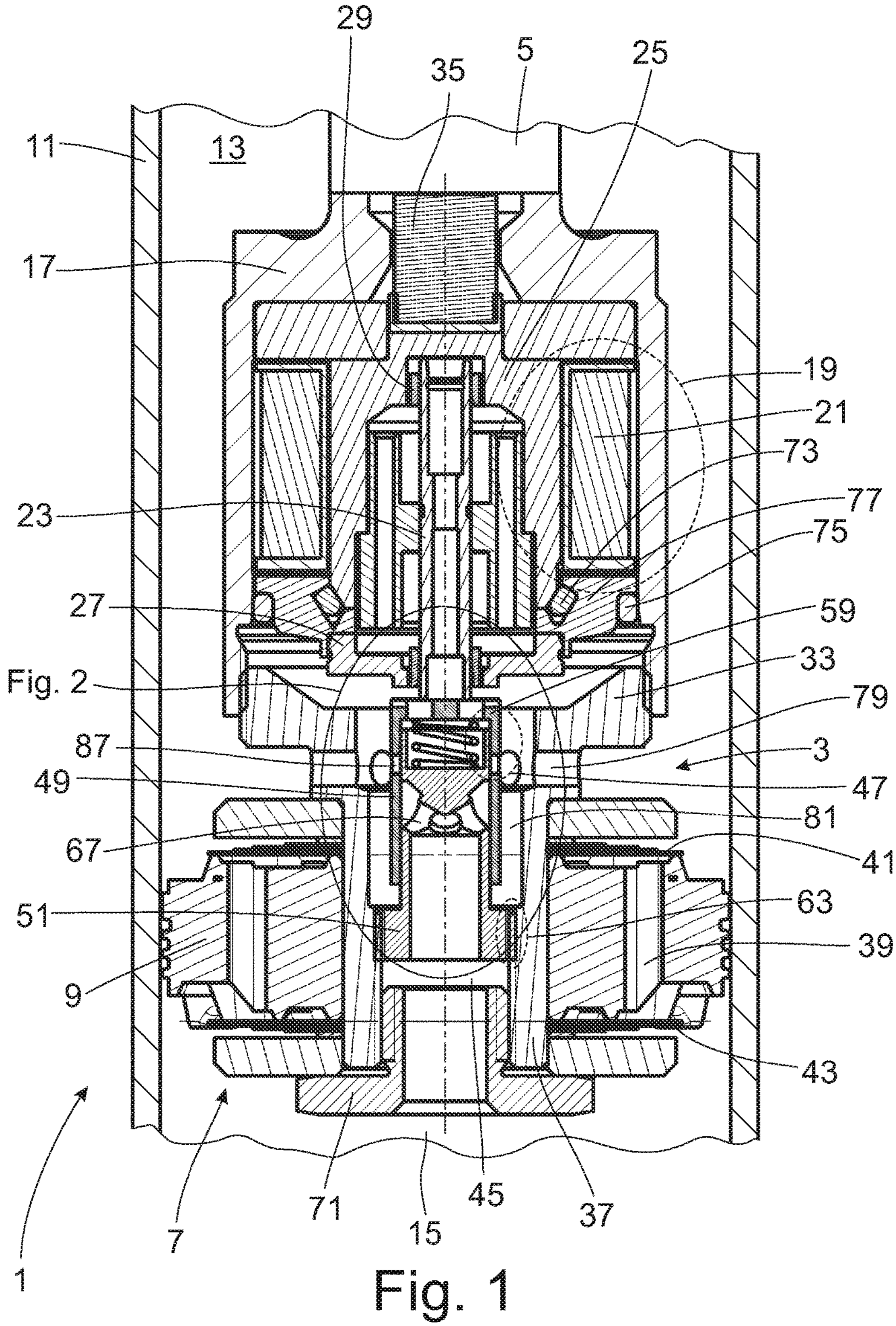
FIG. 1 shows a section from a vibration damper.
Figure 2:
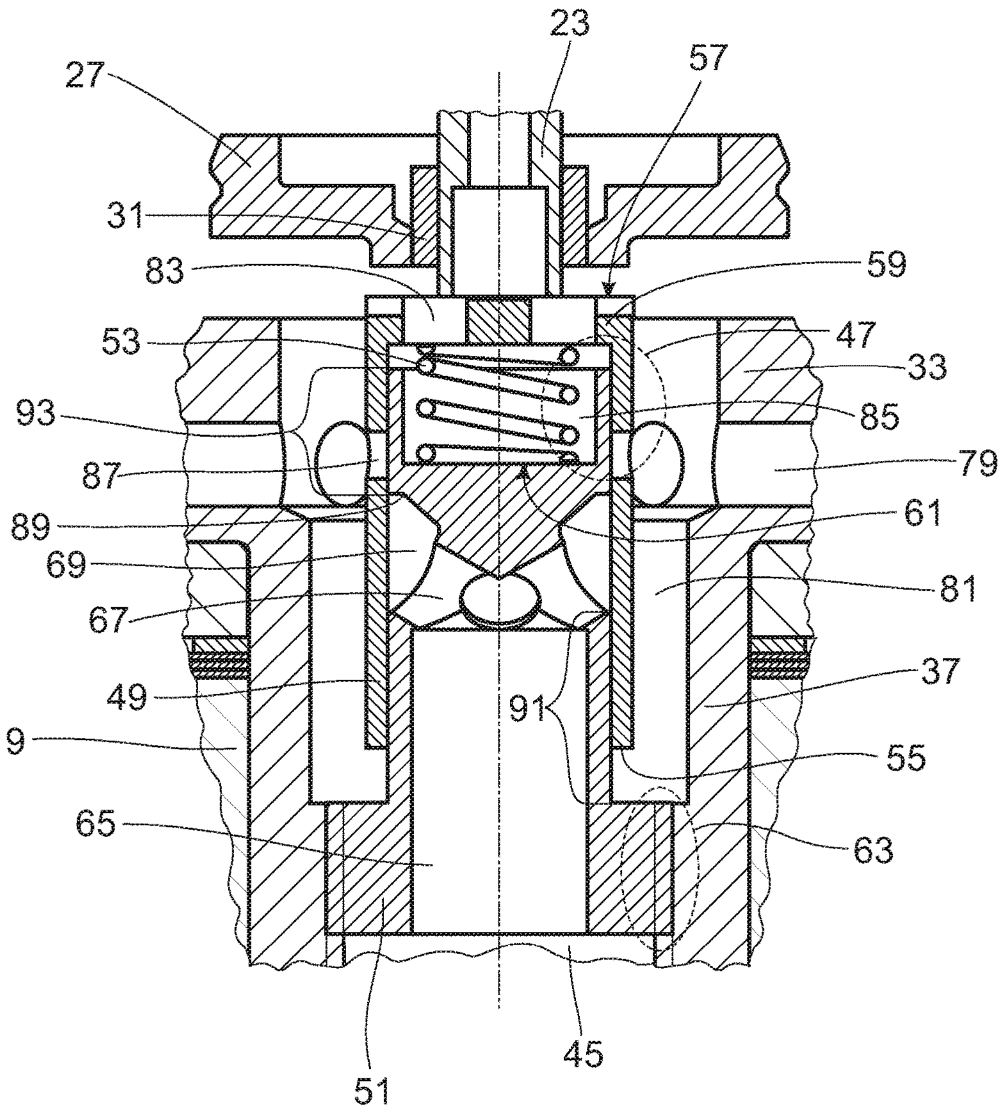
FIG. 2 shows a detail of the adjustable valve.

FIGS. 1 and 2 combined show a section from a vibration damper 1 of a selected type of construction in the region of a damping valve device 3 which is fixed to an axially moveable piston rod 5. The damping valve device 3 has a damping valve 7 constructed as piston valve, wherein an annular valve body 9 of the damping valve divides a cylinder 11 filled with damping medium into a working chamber 13 on the piston rod side and a working chamber 15 remote of the piston rod.

The damping valve device 3 has a pot-shaped housing 17 in which an actuator 19 is arranged. The actuator 19 comprises, inter alia, a coil 21 which exerts an axial displacing force on an armature 23. When excited, the coil 21 generates a displacing movement in move-out direction of the armature 23 out of the housing 17. The radial bearing support of the armature 23 is implemented in a back-iron 25 and in a pole disk 27 in each instance via bearing sleeves 29; 31, respectively. Accordingly, a base 33 which closes the housing 17 in direction of the damping valve 7 is to be regarded as independent from the actuator 19. The actuator 19 is sealed in direction of the coil 21 and a cable connection 35.

The base 33 of housing 17 and a support piece 37 are formed in one piece and accordingly provide the connection to the damping valve 7, which can be constructed in any manner known from the art and of which only one exemplary embodiment form is shown. Only restrictor channels 39 and the associated valve disks 41 for a flow connection between the working chamber 15 remote of the piston rod and the working chamber 13 on the piston rod side can be seen in this sectional view. A comparable configuration exists for the opposite flow direction, wherein only the valve disks 43 of the operative damping valve are shown.

A bypass channel 45 to the damping valve 7 is formed in the support piece 37. The bypass channel 45 is controlled by an adjustable valve 47 which is arranged in the support piece 37. The adjustable valve 47 is a slide valve with a valve body 49 constructed as a sliding sleeve which is guided on a valve carrier 51. A return spring 53 which preloads the sliding sleeve 49 against the armature 23 in an initial direction engages outside of a front side 55 and rear side 57 of the sliding sleeve 49.

The return spring 53 is arranged inside the sliding sleeve 49 and exerts the restoring force on a base 59 of the sliding sleeve 49. The return spring 53 is axially preloaded between the base 59 and an end face 61 of the valve carrier 51.

The valve carrier 51 is axially displaceably supported inside the bypass channel 45. For this purpose, e.g., a threaded connection 63 is provided with the support piece 37.

The valve carrier 51 has a central channel 65 which is formed by a blind-hole aperture which is oriented in direction of the bypass channel 45. At least one diagonally extending transfer channel 67 is connected in turn to the central channel 65 and is connected to a circumferential collection groove 69 of the valve carrier. The collection groove 69 is preferably formed at an inclination to the main axis of the central channel 65 in extension of the transfer channel 67 in order to achieve a rounded out deflection of the flow.

The connection between the valve body 49 and the armature 23 of the actuator 19 is configured as a simple plug-in connection. The plug-in connection is to be conceived of as a floating bearing which is designed for transmitting axial pressure forces. A radial gap provides for compensation of axial offset between the adjustable valve 47 and the armature 23.

The piston valve or damping valve 7 with its valve disks 41; 43 and the annular valve body 9 is fixed by a fastener 71 which engage in the bypass channel 45. The fastener 71 is formed as a hollow screw and makes use of a threaded portion which is also provided for the valve carrier 51. The inner diameter of the hollow screw 71 is greater than the inner diameter of the valve carrier 51 so that at the valve carrier 51 is accessible by a tool even when the piston valve 7 is assembled.

During assembly, a housing 17 connected to the hollow piston rod 5 is outfitted with the actuator 19 in a separate construction segment. An inner seal 73 and outer seal 75 at an insulating washer 77 protect the coil 21 and cable connections, not shown, against moisture.

During a stroke movement of the piston rod 5, damping medium is displaced into the restrictor channels 39 from the working chamber 15 remote of the piston rod. However, damping medium is also conveyed into the bypass channel 45. A valve cross section is adjusted at the adjustable valve 47 depending on the axial position of the sliding sleeve 49. When the coil 21 is highly excited, the actuator 19 exerts a large displacing movement via the armature 23 and moves the sliding sleeve 49 against the force of the return spring 53. This releases a large valve cross section, which tends to be connected with a smaller damping force. The axially acting dynamic pressure forces are supported by the valve carrier 51 which is fixed in the bypass channel 45. The sliding sleeve 49 is acted upon from the inside only by radial forces which, however, are completely compensated.

Without excitation of the coil 21, the valve body 49 is moved by the return spring 63 into a maximum restriction position. The restriction position can mean complete closure or a small restriction cross section. The comparatively large damping force is then generated substantially by the damping valve 7.

During a compression movement of the piston rod 5 into the piston rod side working chamber 13, the damping medium flows via radial channels 79 in the support piece 37 into an annular space 81 which is bounded radially inwardly by a lateral surface of the sliding sleeve 49 and by the front side 55 and rear side 57 of the sliding sleeve 49. In this regard, the front side 55 and the rear side 57 are acted upon hydraulically in parallel by damping medium. At least one connection opening 83 ensures that a pressure compensation space 85 of the sliding sleeve is likewise provided with damping medium. The return spring 53 is also arranged in this pressure compensation space 85. The annular space 81 can also be appreciably narrower radially so that the diameter of the support piece is not allowed to decrease.

When damping medium enters at least one restriction opening 87 which, together with a valve edge 89 of the collection groove 69, determines the valve cross section, the damping medium is prevented from leaking in an undefined manner by valve carrier portions 91; 93 on both sides of the valve cross section. Of course, these valve carrier portions 91; 93 are also operative when the valve cross section is impinged by a flow from the bypass channel 45.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve device comprising:

an actuator;

a fixed valve carrier and a sliding sleeve forming an adjustable valve having two flow directions; said actuator constructed for carrying out an axial displacement movement on said sliding sleeve;

said sliding sleeve comprising a front side and a rear side impinged with damping fluid in an incident flow direction, and wherein, during the incident flow, said front side of said sliding sleeve and said rear side of said sliding sleeve are impinged in parallel by the damping fluid;

wherein said valve carrier comprises at least one diagonally extending transfer channel, and wherein said valve carrier comprises a central channel to which said at least one diagonally extending transfer channel is connected.

2. The damping valve device according to claim 1, additionally comprising a return spring engaged outside of said front side and said rear side for orienting said sliding sleeve into an initial position.

3. The damping valve device according to claim 2, wherein said sliding sleeve comprises a base, and wherein said return spring is arranged inside said sliding sleeve and exerts a restoring force on said base of said sliding sleeve.

4. The damping valve device according to claim 3, wherein said return spring is preloaded between said base of the sliding sleeve and said valve carrier.

5. The damping valve device according to claim 1, wherein the sliding sleeve comprises a pressure compensation space and at least one connection opening to said pressure compensation space.

6. The damping valve device according to claim 5, wherein said return spring is arranged in said pressure compensation space.

7. The damping valve device according to claim 1, wherein said valve carrier includes a valve carrier portion (91; 93) on both sides of a valve cross section of said sliding sleeve.

8. The damping valve device according to claim 1, wherein said valve carrier is axially displaceably supported.

9. The damping valve device according to claim 1, wherein said valve carrier comprises a circumferential collection groove to which said at least one transfer channel is connected.

* * * * *